March 15, 1949. F. ROUX 2,464,348
METALLIC WHEEL WITH RUBBER TIRE
Filed Oct. 31, 1946

Inventor
Fernand Roux

Patented Mar. 15, 1949

2,464,348

UNITED STATES PATENT OFFICE 2,464,348

METALLIC WHEEL WITH RUBBER TIRE

Fernand Roux, Tuffe, France

Application October 31, 1946, Serial No. 706,899
In France August 14, 1946

2 Claims. (Cl. 301—64)

My invention has for its object improvements in metallic wheels with rubber tires employed for motorcars. These wheels are either made of steel and put into shape by a grouping of stamped sections or cast in several parts that are then put together by bolts or by welding.

One of the main aims of the invention is to render easier the building up of wheels of this kind and, to this end, it consists above all in forming the wheels of one single piece of cast metal, preferably a light alloy. But the invention, moreover plans to ensure a high degree of cooling of the rim and tire by a forced draught of air brought about by the revolution of the wheel, and to direct the air currents through the wheels in such a way—as, on the one hand, to improve the aerodynamic balance of the car as a whole, and accordingly to have less pressure against its forward motion and, on the other hand, to reduce the pressure between the surface of the ground and the chassis, that makes the car hold the road better, under similar conditions.

For all these purposes, the improvements, that form the aim of the invention, are brought out especially by the points given below that may be adopted separately or together in any desired manner.

(a) The rim is connected to a single wheel-disk that allows the attachment of the wheel to the axle, and that comprises on its outside blades that are arranged and directed in such a way as to drive the air from the inside of the wheel towards the outside.

(b) The wheel-disk is off-set towards the outside of the wheel and its joining with the rim is strengthened by a skirt, in the shape of a truncated cone, that provides right against the rim a passageway of annulus or torus shaped section in which the air displaced through the blades travels round thus keeping the rim and tire cooled.

(c) On the frusto-conical skirt there is a provision of equally distributed air-inlets between which are arranged, on the inner surface of the torus-shaped passage for air circulation, some fins of which the duty is to head the air against the rim and thus to accentuate the play of air on the rim.

(d) The hub-cap is made of cast metal for choice in the shape of a bell of which in the edge seats on a corresponding bearing surface of the wheel-disk around the middle area of this wheel-disk that is set apart for the attachment of the wheel on the axle, while the hub-cap is fastened by a single central screw to a strap or bridge shaped part carried by the wheel.

(e) Carrying on from paragraph (d) the base of the strap or bridge shaped part includes a ring that is fitted through a cone-shaped surface on a corresponding bearing area of the disk and that is connected by cross arms to a plate through which a hole has been drilled to take the screw that attaches the hub-cap.

The accompanying drawings illustrate, as an example only, one way of carrying out an improved wheel according to my invention.

Figure 1:
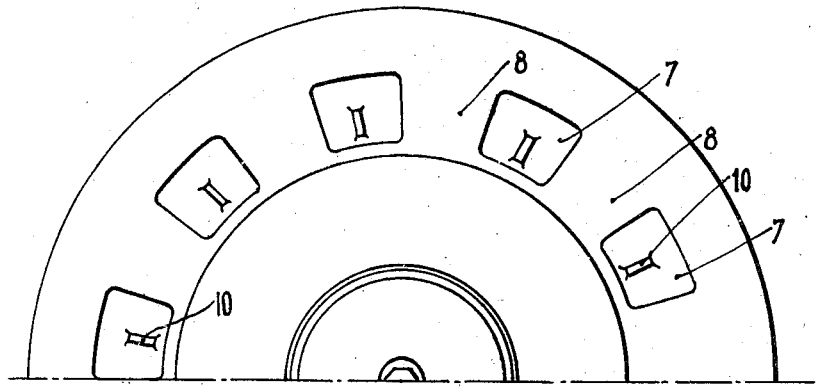
Figure 1 is a half elevational view showing the outside of the wheel.
Figure 2:
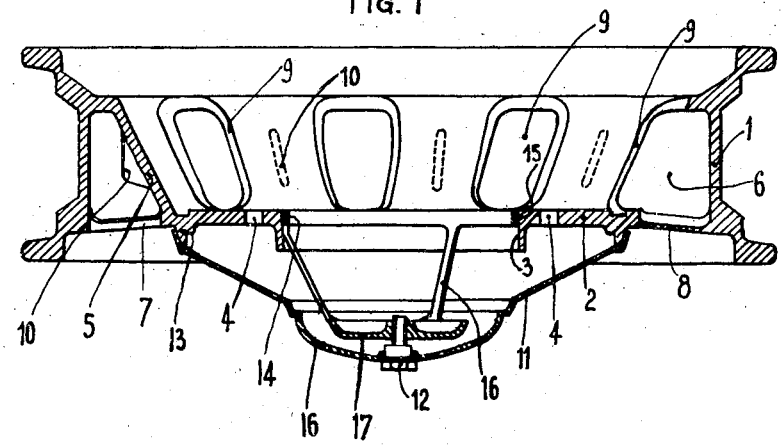
Figure 2 is a diametrical section to correspond with Figure 1.

According to one of the features of the invention, the wheel is cast in one piece and as a matter of choice is made of a light alloy, although this is not an indispensable point. There is thus no welding involved. The cross section of the rim 1 shows the usual standard outline for the mounting of rubber tires as practised today and the wheel comprises only a single disk 2 off-set towards the outer side and furnished with the ordinary middle opening 3 and bolt holes 4 to take the bolts used for attachment to the axle. The joining of the wheel-disk 2 with the rim is strengthened by a skirt in the shape of a truncated cone 5 of which the larger base is joined with the rim on the side away from the wheel-disk. So there is an arrangement, in the closest proximity to the rim, of a torus-shaped air-space with a trapezoidal or substantially triangular cross-section, that, from a mechanical standpoint, gives the wheel a cross-section with a high momentum of inertia.

In accordance with a further feature of the invention, the outer rim of the disk 2 is furnished with openings 7 that are evenly distributed and define between one another blades 8 that are so shaped that when they revolve with the wheel they set up an air-circulation sucked in through the openings 9 cut in the frusto-conical skirt 5. The circulating air drawn into the air-space 6 of torus-shaped cross-section meets besides fins 10, furnished on the inner surface of the skirt, that are given an outline and direction in such a way that they act as a brake for the air-circulation and with the addition of the effect of centrifugal force, they allow a longer play of the air on the rim that is together with the tires, cooled in the most satisfactory way at high running speeds of cars furnished with improved wheels built up on the lines of my invention.

Figure 3:
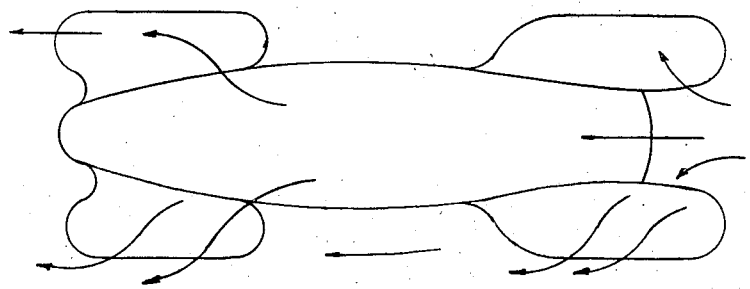
Figure 3 shows in a diagrammatic way the air-circulation through the wheels of a motorcar.

Figure 3 shows by following the arrows the natural course of the air currents with reference to the car. It will be evident at once that the improved wheels make a substantial improvement to the aerodynamic balance of the car as a whole in its lower portion that usually proves, in the case of the majority of coachworks, the reason of unfavourable slip-streams. But in addition, the wheels built up on the lines of the invention provide the lowering of the pressure between the chassis and the ground that under otherwise similar conditions allows the tires to hold the road very much better.

According to a further feature of the invention, the hub-cap is formed by a bell-shaped member 11 that is attached to the wheel by a single screw 12 passing through its centre. The hub-cap is preferably of cast metal and bears concentrically through its conical edge against a corresponding seating 13 of the disk 2. A strap or bridge shaped member 14 engages through its conical annular part 14, a corresponding bearing surface 15 of the disk 2 and comprises a plate 17, connected through cross arms 16 to said annular part 14 and provided with a hole bored through the middle of it to take the screw 12 that fastens the hub-cap.

The arms 16 that in the ordinary course are under tension may be slender so that they may snap when the hub-cap gets a fairly hard knock. This contrivance contributes to the protection of the frame of the wheel.

My invention obviously is not restricted to the particular method of carrying it into effect that has been clearly and closely presented. It includes in its general scope all the particular means and association of such means that can be adopted for the execution of a wheel of the type defined in accompanying claims.

What I claim is:

1. A metallic wheel for pneumatic tires made of a single cast part comprising a single disc adapted to be secured to the axle, a rim portion offset axially with reference to the disc towards the inside of the wheel, an intermediary member lying substantially in the plane of the disc and connecting the outer periphery of the disc with one side of the rim and including an annular series of blades arranged and directed so as to provide a displacement of air from the inside of the rotating wheel towards the outside thereof and a second intermediary member connecting the outer periphery of the disc with the side of the rim offset with reference to the disc, assuming an oblique direction to form a triangular channel with the inside of the rim and the first intermediary member and provided with openings opposing the solid blade parts of said first intermediary member, the remaining solid portions of last mentioned intermediary member being arranged and directed so as to provide for a continuation of the displacement of the air passing between the blades of the intermediary member.

2. A metallic wheel for pneumatic tires made of a single cast part comprising a single disc adapted to be secured to the axle, a rim portion offset axially with reference to the disc towards the inside of the wheel, an intermediary member lying substantially in the plane of the disc and connecting the outer periphery of the disc with one side of the rim and including an annular series of blades arranged and directed so as to provide a displacement of air from the inside of the rotating wheel towards the outside thereof and a second intermediary member connecting the outer periphery of the disc with the side of the rim offset with reference to the disc, assuming an oblique direction to form a triangular channel with the inside of the rim and the first intermediary member and provided with openings opposing the solid blade parts of said first intermediary member, the remaining solid portions of last mentioned intermediary member being arranged and directed so as to provide for a continuation of the displacement of the air passing between the blades of the intermediary member, and short radial fins carried by the solid portions of the second member, and projecting towards the corresponding openings between the blades of the first intermediary member.

FERNAND ROUX.

REFERENCES CITED

The following references are of record in the file of this patent:

UNITED STATES PATENTS

| Number    | Name      | Date          |
|-----------|-----------|---------------|
| 1,580,011 | Bugatti   | Apr. 6, 1926  |
| 2,053,735 | Overholser| Sept. 8, 1936 |
| 2,242,986 | Zipper    | May 20, 1941  |